United States Patent [19]

Better et al.

[11] 3,985,368
[45] Oct. 12, 1976

[54] QUICK-CHANGE SPINDLE NOSE ADAPTER
[75] Inventors: Bernard R. Better; Edward Hain, both of Chicago, Ill.
[73] Assignee: The Bendix Corporation, Southfield, Mich.
[22] Filed: Nov. 25, 1974
[21] Appl. No.: 526,487

[52] U.S. Cl. .................................. 279/75; 279/1 B
[51] Int. Cl.² ........................................ B23B 31/22
[58] Field of Search ................. 279/75, 1 B, 81, 82, 279/22, 30, 37, 43, 50, 57, 65, 74, 80

[56] References Cited
UNITED STATES PATENTS

| | | | |
|---|---|---|---|
| 3,070,380 | 12/1962 | Holmberg | 279/75 X |
| 3,552,758 | 1/1971 | Siegler | 279/82 X |

FOREIGN PATENTS OR APPLICATIONS

| | | | |
|---|---|---|---|
| 537,236 | 3/1922 | France | 279/37 |

Primary Examiner—Robert Louis Spruill
Assistant Examiner—Z. R. Bilinsky
Attorney, Agent, or Firm—John R. Benefiel

[57] ABSTRACT

A quick-change spindle nose adapter is disclosed of the type in which an axially moveable control sleeve is utilized to cause radially moveable balls to either engage an adjustable adapter nut in one position or to be released in another position, featuring an improved stay-open arrangement for the control sleeve provided by a camming connection between the control sleeve and a mounting sleeve which creates a lock therebetween upon slight rotation of the control sleeve when the control sleeve is in the open position.

3 Claims, 4 Drawing Figures

QUICK-CHANGE SPINDLE NOSE ADAPTER

BACKGROUND OF THE INVENTION

1. Field of the Invention

This invention concerns chucks, and more particularly quick-change spindle nose adapters in which a toolholder adjuster nut is gripped by a plurality of radially moveable balls which are locked in gripping relationship by means of an axially reciprocable control sleeve.

2. Description of the Prior Art

A recognized desirable feature of quick-change adapters of the type described above has been a "stay-open" capability for the control sleeve, that is, the control sleeve can be detented in the unlock position so that both hands are available for the handling of heavy toolholder assemblies.

Heretofore, such capability has been provided by axially moveable elements which are engaged by the toolholder assembly so that whenever it is not seated in the adapter, the control sleeve will automatically detent open. Typical arrangements are shown in U.S. Pat. Nos. 2,970,844; 3,552,758; and British Pat. No. 342,678.

These arrangements have, in general, been relatively complicated and have added significantly to the cost of the assembly.

In addition, in removing a toolholder, the toolholder must be advanced at least partially out while the control sleeve is in the unlock position. While the axially moveable element may automatically force the nut out if friction is low, or if the toolholder is relatively unweighty and the installation angle is downward, in some installations the toolholder must be manually advanced in order to lock open the control sleeve.

It is, therefore, an object of the present invention to provide a stay-open capability for such an adapter which is relatively simple and inexpensive to add, and also does not require any handling of the toolholder to actuate.

SUMMARY OF THE INVENTION

These and other objects which will become apparent upon a reading of the following specification and claims is accomplished by providing a camming connection between the control sleeve and a mounting sleeve which upon slight rotation of the control sleeve when in the unlocked position creates a lock therebetween to provide the stay-open capability without depending on the position of the toolholder.

DETAILED DESCRIPTION

Figure 1:
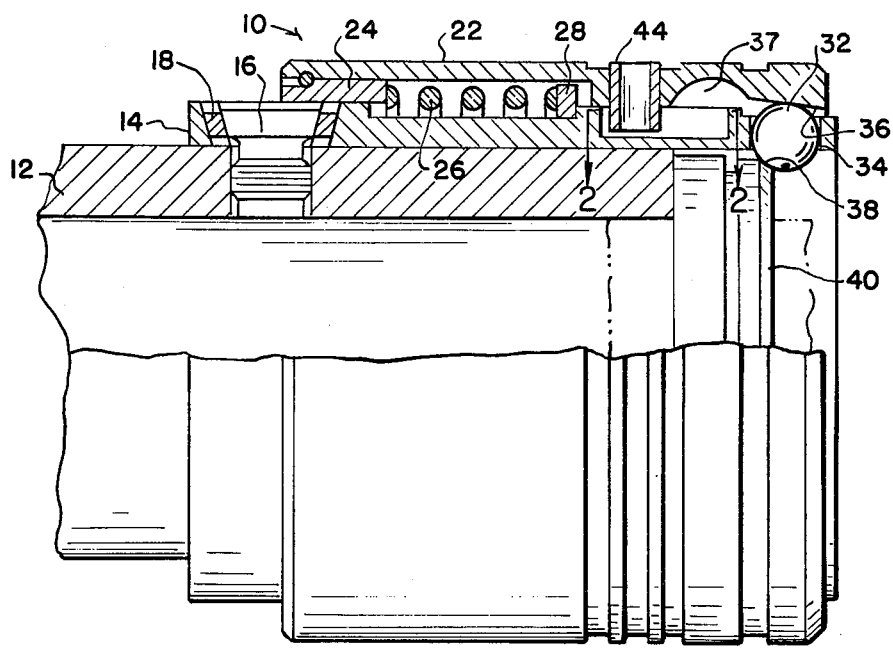
FIG. 1 is a view in partial longitudinal section of a quick-change adapter according to the present invention, shown in the locked position.

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

Referring to the Drawings, the adapter assembly 10 is adapted to be fixed to a machine spindle 12 by means of a holder sleeve 14 slidingly fit thereover and fixed thereto with a set screw 16 threaded into the spindle 12. The relative axial position of the holder sleeve 14 and the spindle 12 may be slightly adjusted by means of an eccentric adjusting bushing 18 seated in a tapered opening 20 formed in the holder sleeve 14.

Figure 3:
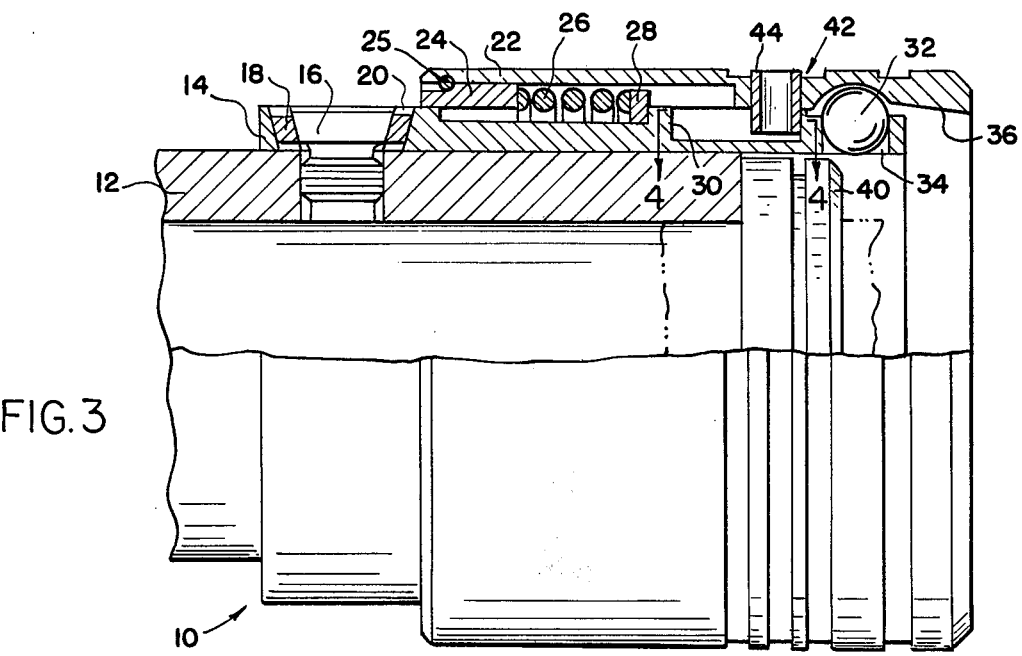
FIG. 3 is a view in partial longitudinal section of the holder depicted in FIG. 1, shown in the unlocked, stay-open position.
Figure 2:
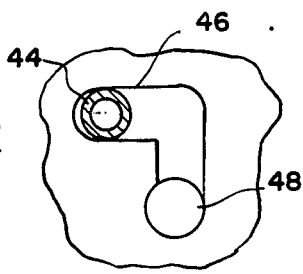
FIG. 2 is a view of a portion of the holder shown in FIG. 1, in the direction 2—2.
Figure 4:
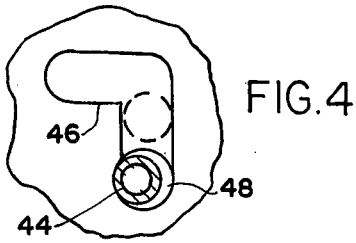
FIG. 4 is a view of a portion of the holder shown in FIG. 3 in the directon 4—4.

Fit over the holder sleeve 14 is a control sleeve 22, and means are provided for retaining the control sleeve thereon so as to allow a limited axial movement, the retainer means being provided by the interaction of a retainer 24, retainer ring 25, compression spring 26, and snap ring 28 cooperating with a shoulder 30 formed on the O.D. of the holder sleeve 14. Compression spring 26 also comprises bias means urging the control sleeve 22 in one axial direction, i.e., to the left to the position shown in FIG. 1, while allowing limited axial movement against the bias of the compression spring in the other axial direction, i.e., to the right to the position shown in FIG. 3.

The quick-change assembly also includes a plurality of balls 32 each carried in a respective one of a plurality of openings 34 formed in the end of holder sleeve 14 disposed about the periphery of the control sleeve. The openings 34 are formed with tapered seats so that radial inward movement of the balls 32 is limited as shown in FIG. 1.

The outward position of the balls 32 is controlled by means of an engagement with a taper surface 36 formed on the control sleeve so that whenever the control sleeve 22 is moved to the left to the axial position shown in FIG. 1, the balls 32 are caused to move inwardly so that in the extreme position in the one direction they protrude into the inside of the holder sleeve so as to engage and retain the toolholder by means of an engagement with chamfer 38 formed on adjustable adapter nut 40 which carries the toolholder (not shown). Upon moving the control sleeve 22 to the right against the bias of compression spring 26, the relieved area provided by groove 37 comes into registry with the balls 32 in the extreme direction, thus providing radial clearance so that the balls 32 are free to move outwardly and release the toolholder.

The improvement according to the present invention is provided by a rotary cam connection means 42 between the control sleeve 22 and the holder sleeve 14. This cam connection 42 includes a roll pin 44 fixed to the control sleeve 22 and extending into an L-shaped slot 46 formed in the holder sleeve 14 in an axial position intermediate the balls 32 and the compression spring 26.

Slot 46 is positioned so that the control sleeve 22 may be axially moved with the pin moving along the slot arm parallel to the assembly axis and when the control sleeve 22 is in the forward (unlocked) position, it may be rotated so that the roll pin 44 enters the arm of the slot 46 extending transversely to the assembly axis. Continued rotation allows the roll pin 44 to move to the detent position provided by a hole 48 slightly larger than the slot 46 width, thus locking the control sleeve 22 to the holder sleeve 14.

Thus, it can be seen that the control sleeve 22 can be held in the open position by slightly rotating the same manually after axial movement to the position whereat the balls 32 are allowed to release the toolholder.

Since this arrangement is quite simple and inexpensive and does not require any movement of the toolholder to operate, it can be appreciated that the objects of the present invention have been attained by this arrangement.

What is claimed is:

1. A quick-change spindle nose assembly for axially positioning a toolholder assembly with respect to a spindle nose comprising:

a holder sleeve adapted to be fit over and fixed to said spindle;

a control sleeve fit over said holder sleeve and adapted to be axially slidable thereon;

means retaining said control sleeve on said holder sleeve so as to allow limited axial movement of said control sleeve on said holder sleeve;

bias means urging said control sleeve to move axially in one direction;

a plurality of balls carried by the holder sleeve in a respective one of a plurality of openings disposed about the periphery of the holder sleeve;

said control sleeve causing said plurality of balls to move radially inwardly to protrude inside said holder sleeve whenever said control sleeve is moved to the extrememost position of said control sleeve on said holder sleeve in said one direction by means of an engagement with a surface formed on the control sleeve, said control sleeve further allowing said balls to move radially outwardly whenever said control sleeve is moved to the extrememost position on said holder sleeve in said other direction by means of a registry of a relieved area on said control sleeve with said plurality of balls;

rotary cam connection means between said holder sleeve and said control sleeve, said rotary cam connection means including means locking said control sleeve to said holder sleeve upon rotation of said control sleeve when the control sleeve is in its extrememost position in the other of said axial directions, whereby said control sleeve may be held in said position whereat said balls are free to move radially outwardly in said openings in said holder sleeve by manual rotation of said control sleeve.

2. The assembly of claim 1 wherein said cam connection means includes a pin fixed to one of said sleeves and an L-shaped slot formed in the other of said sleeves and wherein said pin extends into said slot and said L-shaped slot has one leg thereof extending parallel to the axis of said assembly and the other leg thereof extending transversely thereto.

3. The assembly of claim 2 wherein said bias means includes a compression spring acting on said control sleeve slot and wherein said pin and slot are located axially intermediate said plurality of balls and said compression spring.

* * * * *

UNITED STATES PATENT OFFICE
CERTIFICATE OF CORRECTION

Patent No. 3,985,368  Dated October 12, 1976

Inventor(s) Bernard R. Better, et al

It is certified that error appears in the above-identified patent and that said Letters Patent are hereby corrected as shown below:

On the title page, delete the drawing figure as shown and substitute the following drawing figure therefore:

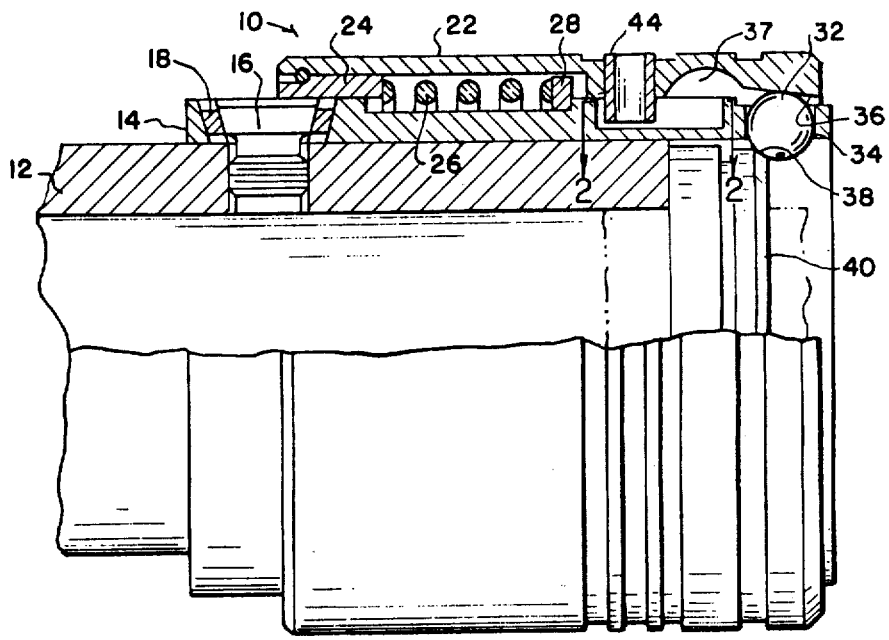

Signed and Sealed this

Twenty-second Day of March 1977

[SEAL]

Attest:

RUTH C. MASON
Attesting Officer

C. MARSHALL DANN
Commissioner of Patents and Trademarks